Dec. 11, 1956  W. E. MATHI  2,773,646
MECHANISM FOR CONTROLLING ACCUMULATIONS AROUND A FIXED
DECIMAL AND FOR ADJUSTING A COUNTER ACTUATOR IN
SELECTED ORDINAL RELATION TO AN
ACCUMULATOR ACTUATOR
Filed March 7, 1952  9 Sheets-Sheet 5
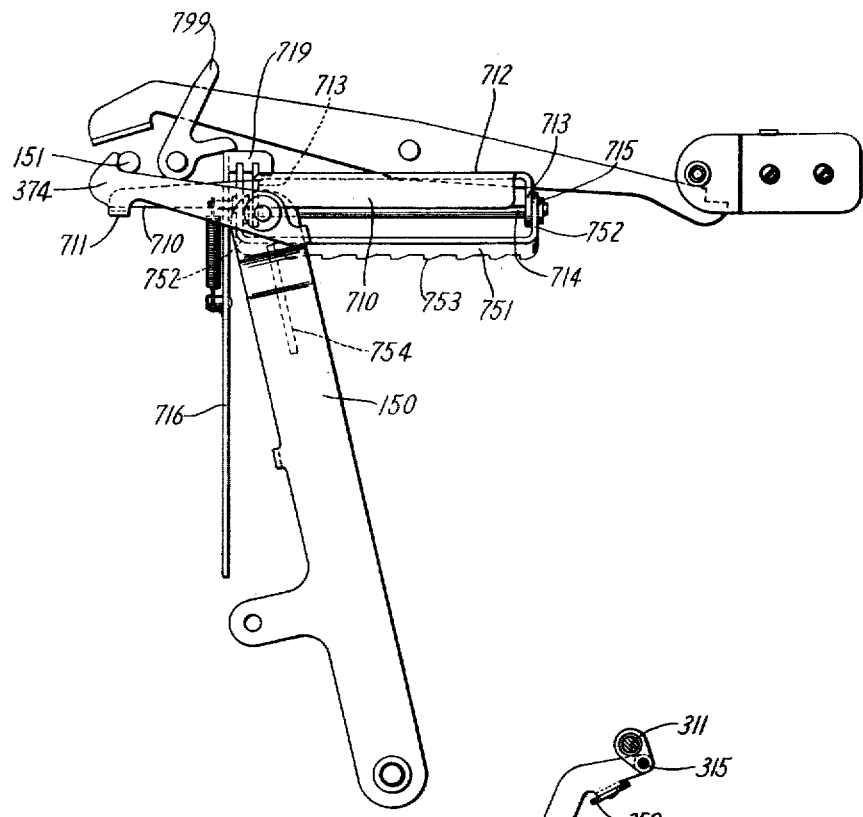
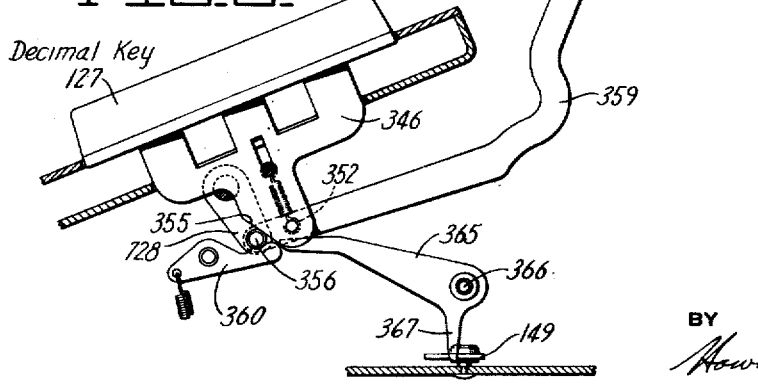
INVENTOR
Walter E. Mathi
BY
Howard M. Dustin

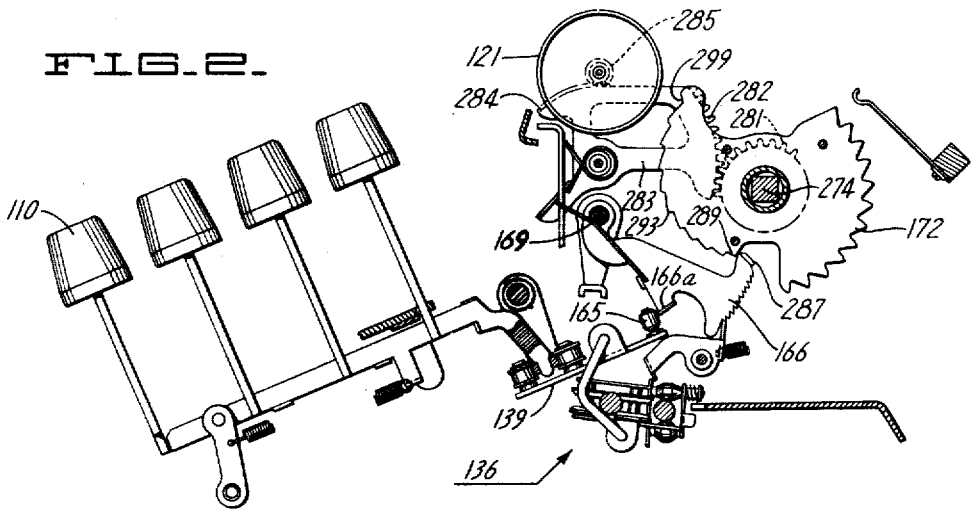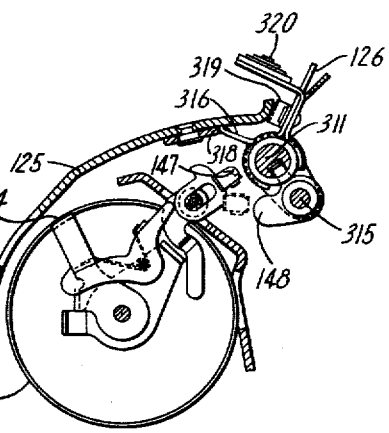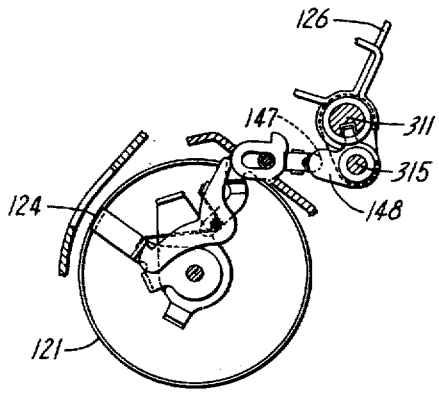

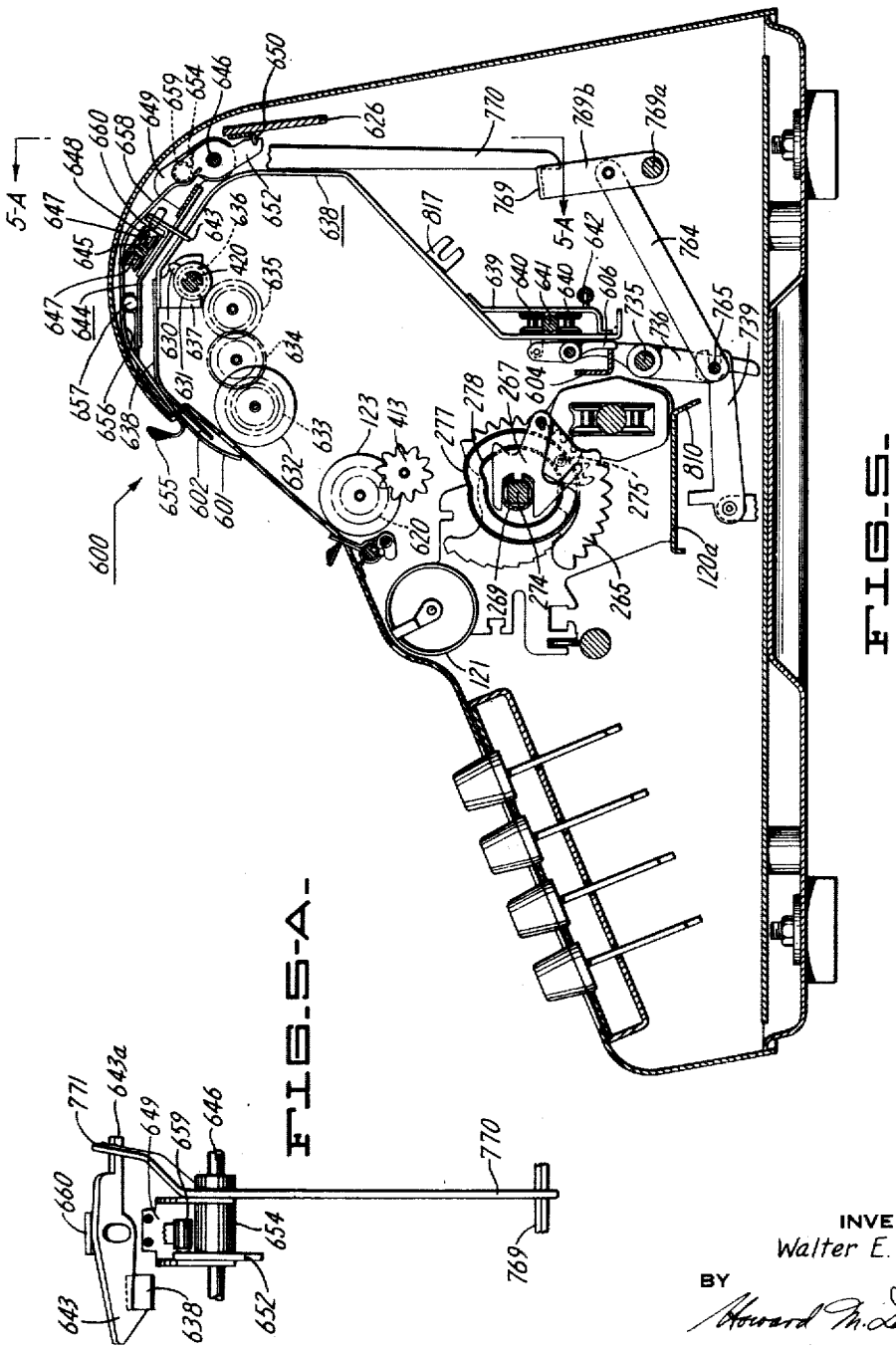

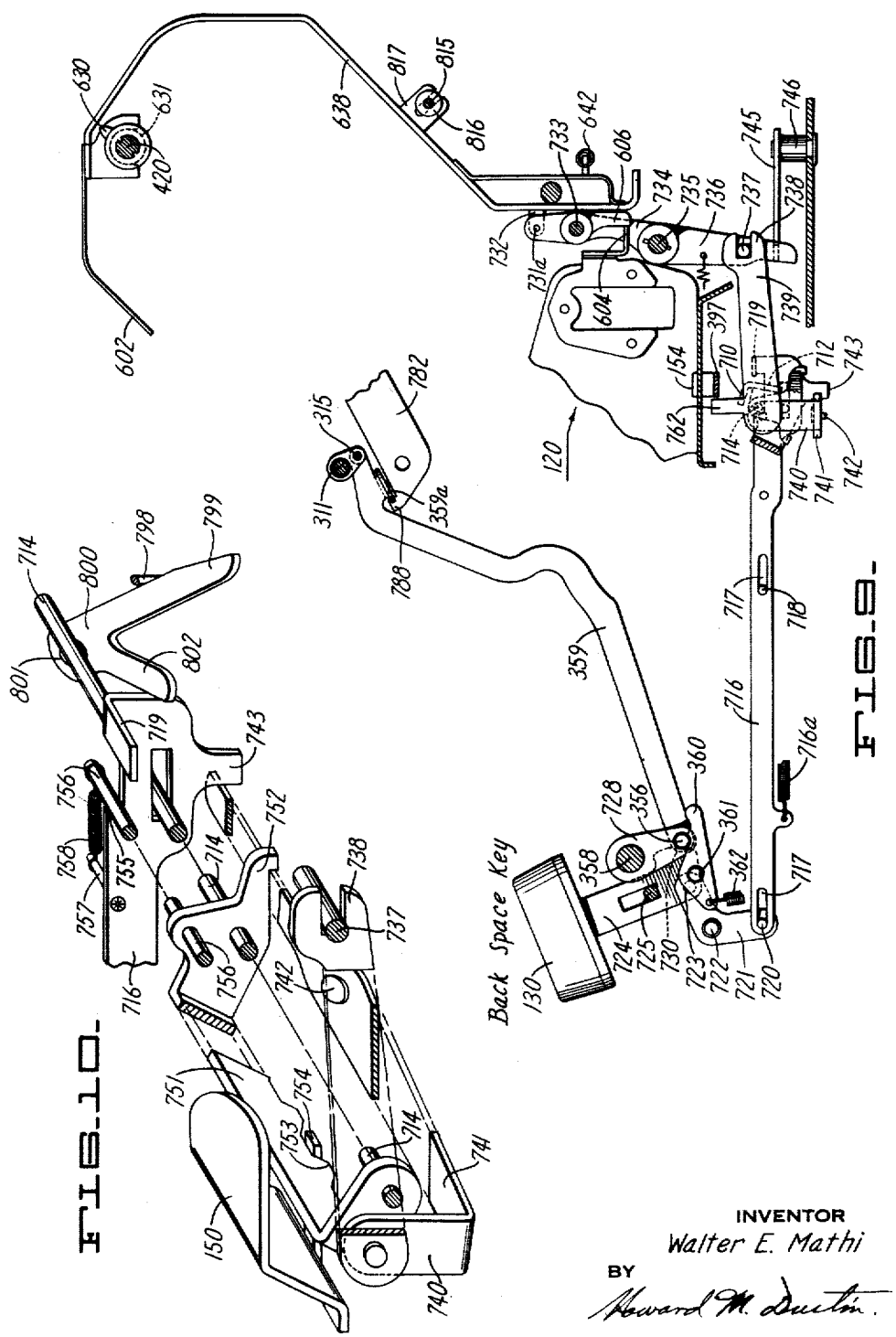

Dec. 11, 1956  W. E. MATHI  2,773,646
MECHANISM FOR CONTROLLING ACCUMULATIONS AROUND A FIXED
DECIMAL AND FOR ADJUSTING A COUNTER ACTUATOR IN
SELECTED ORDINAL RELATION TO AN
ACCUMULATOR ACTUATOR
Filed March 7, 1952  9 Sheets-Sheet 7
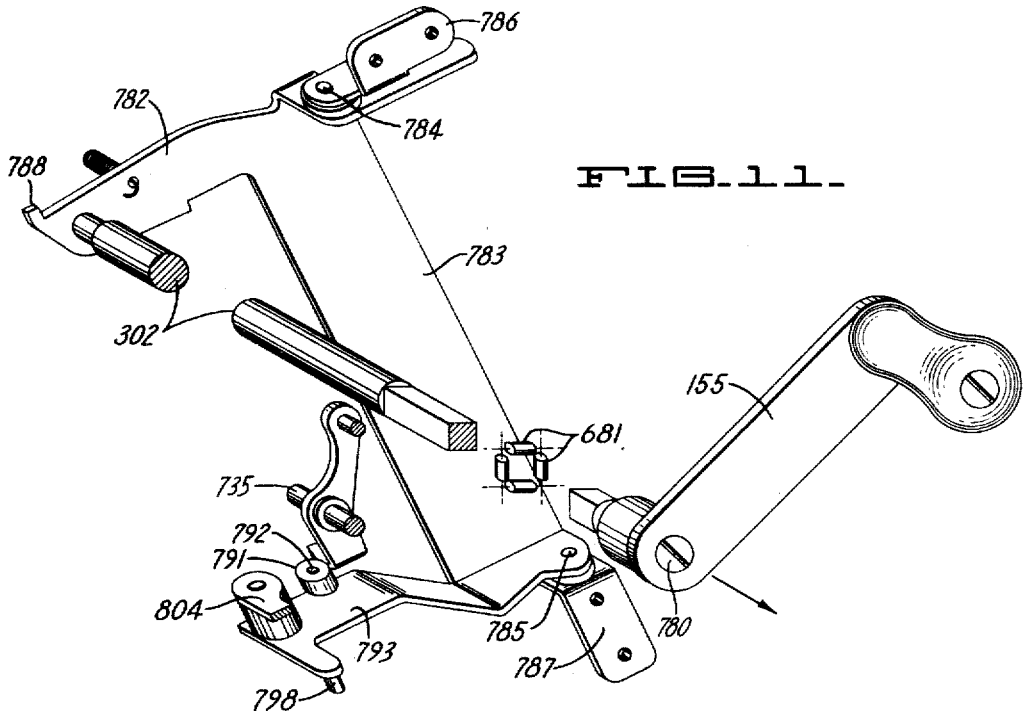
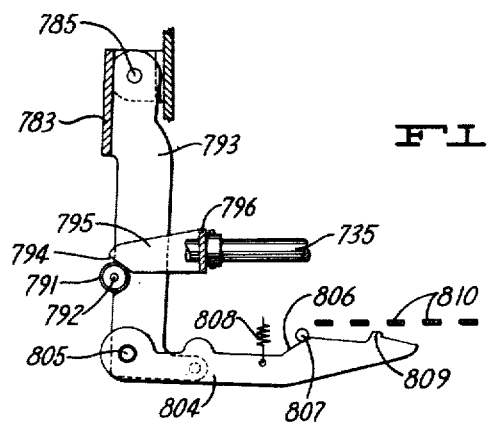
INVENTOR
Walter E. Mathi
BY
Howard M. Dustin.

Dec. 11, 1956 W. E. MATHI 2,773,646
MECHANISM FOR CONTROLLING ACCUMULATIONS AROUND A FIXED
DECIMAL AND FOR ADJUSTING A COUNTER ACTUATOR IN
SELECTED ORDINAL RELATION TO AN
ACCUMULATOR ACTUATOR
Filed March 7, 1952 9 Sheets-Sheet 8

INVENTOR
Walter E. Mathi
BY
Howard M. Dustin

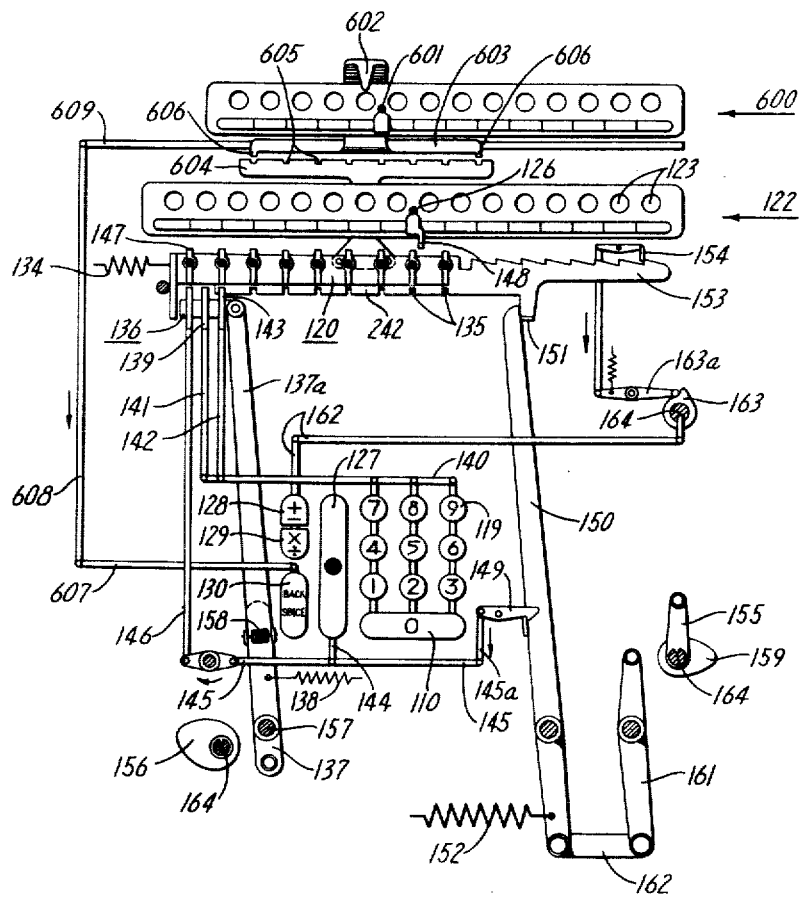

United States Patent Office 2,773,646
Patented Dec. 11, 1956

2,773,646

MECHANISM FOR CONTROLLING ACCUMULATIONS AROUND A FIXED DECIMAL AND FOR ADJUSTING A COUNTER ACTUATOR IN SELECTED ORDINAL RELATION TO AN ACCUMULATOR ACTUATOR

Walter E. Mathi, Oakland, Calif., assignor to Marchant Calculators, Inc., a corporation of California Application March 7, 1952, Serial No. 275,251

6 Claims. (Cl. 235—63)

The present invention relates to decimal indicating means for "ten key" calculating machines and the like and particularly concerns means for automatically registering the result of a calculation in correct decimal relationship to a selectively positioned decimal indicator of a result register.

The present invention is disclosed as embodied in a ten key calculating machine of the type described in a co-pending patent application of Howard M. Dustin, Serial number 275,259, now Patent No. 2,702,668, filed on even date herewith. The machine disclosed in that application is characterized by mechanism that is operable to enter a selected numeral value into the actuating mechanism, to establish the decimal point of said value, and then to bring the decimal point and its numeral value into correct decimal alignment with the selectively established position of the decimal point of the accumulator register. A single turn of the hand crank in one or the other direction enters the selected addend or subtrahend into the accumulator register, and during the latter part of the rotation of the handcrank, it normalizes the factor decimal, resets the various orders of the actuating mechanism to zero and restores a shiftable actuator carriage to its initial starting position, thereby restoring the machine to a condition for receiving the entry of the next factor.

The present invention includes a decimal indicator for the accumulator register and a decimal indicator for the counter register, each of which may be selectively set in any one of a respective series of ordinal positions. In multiplication and division operations, the product or the quotient, as the case may be, is automatically entered in correct relationship to the decimal point of its respective register regardless of the ordinal position selected for the decimal point.

One important feature of the invention is that the setting of the decimal point for the counter register in a selected position also determines the ordinal location of the actuator for that register. The arrangement is such that at the beginning of each calculation the counter actuator is in a position to enter a count in the first order to the left of the counter decimal point.

The counter register decimal point is locked in its selectively set position throughout a calculation, while the counter actuator is shifted relative to the counter register. Then, at the beginning of the next calculation, the counter actuator is restored to its initially set position adjacent the counter register decimal point. In this manner the counter actuator enters one or a plurality of factors into the counter register in correct ordinal relationship to a selectively set decimal point regardless of the ordinal point of entry into the accumulator register.

The present invention is therefore based upon the principle of first locating the counter actuator relative to the counter register in accordance with the location of a selectively set decimal indicator for that register and thereafter locking the counter actuator to the actuator for the accumulator register so that the counter actuator is shifted relative to its decimal indicator each time the accumulator actuator is shifted relative to the accumulator register.

A main object is to move a single order counter actuator to a selected ordinal position of the counter register under the control of a selectively settable counter decimal indicator.

Another object of the invention is to selectively predetermine the ordinal location of the entry of a value in the counter register by connecting the counter actuator to the counter decimal indicator and by moving the two as a unit to any selected order of the counter register.

Another object is to set the quotient register decimal indicator in a selected ordinal position in that register and to enter the quotient in correct decimal relationship to the decimal indicator by first moving the counter register actuator with the decimal indicator to the selected ordinal position and thereafter locking the counter actuator to the product register actuator for shifting movement of the two actuators as a unit throughout the division operation.

Another object is to connect the counter actuator to the counter decimal indicator for simultaneous shifting movement of the two to a selected decimal position, and to disconnect the counter actuator from the counter decimal indicator by depression of a control key to permit free shifting movement of the actuator while the decimal indicator remains in said selected position. Another object is to bring the carriage of a calculator to a selected position in which the decimal points of an accumulator register and a factor receiving device are aligned by two respective decimal stops and to disengage said stops by operation of the shift control mechanism to permit shifting of the carriage without restraint by said stops.

Other objects and advantages of the invention will become apparent from the following detailed description of the invention in which:

Fig. 2 is a right side view in section of the value entering mechanism.

Fig. 3 is an enlarged right side view of a factor indicator numeral wheel together with the decimal indicator for the accumulator register.

Fig. 4 is a right side view of the same mechanism shown in Fig. 3 with the parts in the positions they assume during decimal alignment between the factor indicator numeral wheels and the decimal point of the accumulator register.

Fig. 5 is a right side view of the machine, partly in section, showing the various registers and decimal control mechanisms.

Fig. 5A is a detailed view in section taken on the line 5A—5A of Fig. 5.

Fig. 7 is a plan view of part of the shift control mechanism.

Fig. 8 is a right side view of the decimal key and related mechanisms.

Fig. 9 is a right side view of the back space key and related mechanisms.

Fig. 10 is an isometric projection as seen from the right rear of the machine showing a part of the shift control mechanism appearing in Fig. 7.

Fig. 11 is an isometric projection of the right shift control mechanism as viewed from the right front of the machine.

Fig. 12 is a plan view of part of the shift control mechanism.

Fig. 14 is a schematic illustration of the various decimal and shift control mechanisms.

General description

Figure 1:
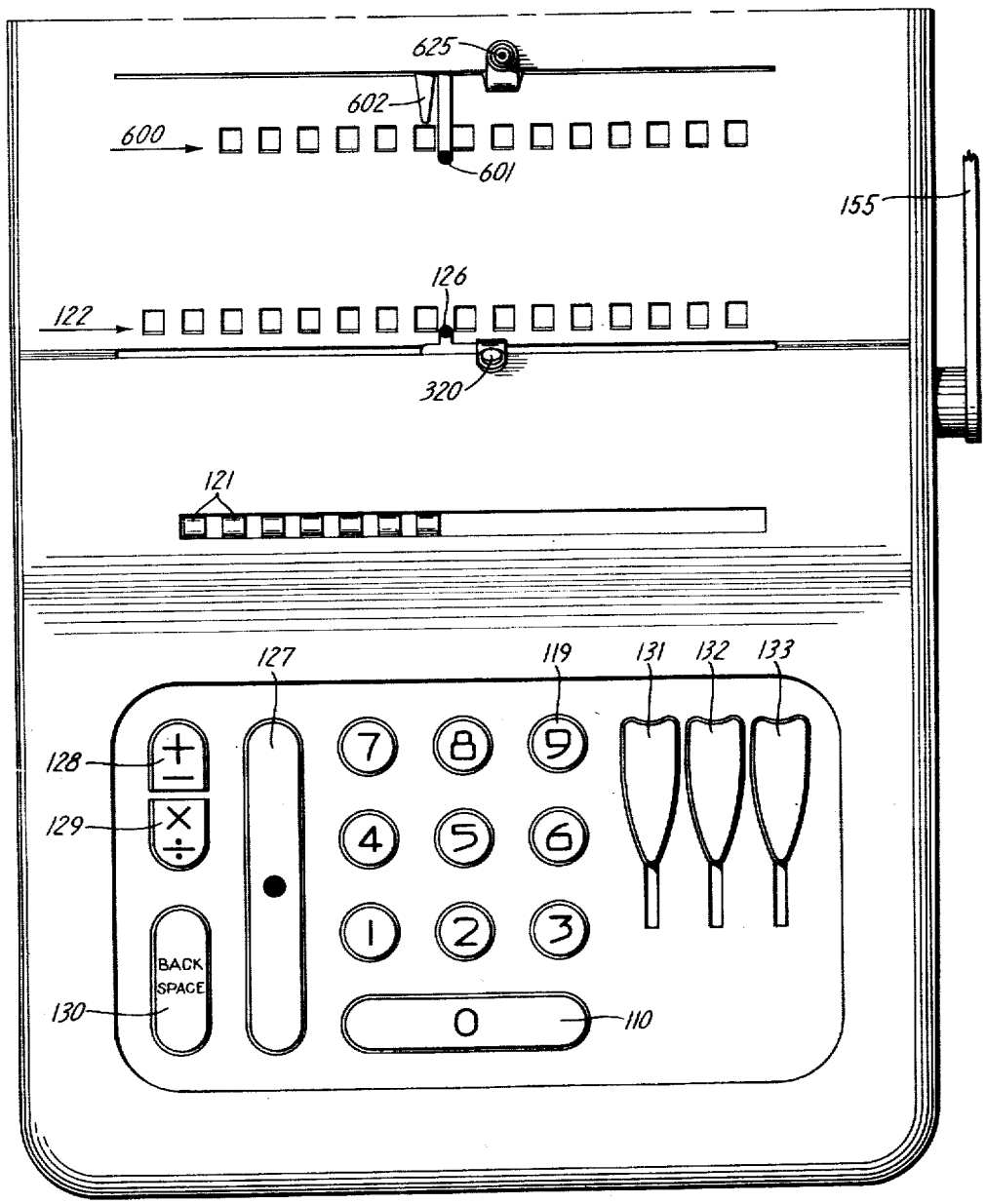
Fig. 1 is an exterior plan view of the calculating machine in which the present invention is embodied.

The operation of the machine will first be described in connection with the schematic illustration shown in Fig. 14.

The counter register is generally indicated at 600, while the accumulator register is generally indicated at 122. The counter register is provided with a decimal point 601 which may be set in any ordinal position of the counter register. The actuating mechanism for the counter register comprises a single ordinal element (not shown) which is related to the decimal point 601 and normally moves with the decimal point when the latter is moved to a selected position. A pointer 602 indicates the order with which the counter actuator is aligned at the beginning of the calculation, and the arrangement is such that the counter actuator is normally aligned with the first order to the left of the decimal point of the counter register as indicated by the pointer 602.

The accumulator register 122 is provided with a decimal indicator 126 which may be selectively set in any decimal indicating position in the register, and carries a lug 148 which determines the ordinal location of the entry of values into the accumulator register 122 as is later described. A plural order actuating mechanism for the numeral wheels of the accumulator register is mounted for shifting movement on a carriage generally indicated at 120. The actuator carriage remains stationary in a leftmost position relative to the accumulator register 122 during the entry into the actuating mechanism of the digits before the decimal point. These digits will hereinafter be referred to as integral digits, while the digits after the decimal will be referred to as decimal digits.

A single order selection setting carriage 136 is provided for adjusting the respective orders of the actuating mechanism in accordance with the values of the depressed entry keys 110–119, and the carriage 136 is stepped one order to the right of the actuator carriage 126 for each such entry made. The depression of a key 110–119 acts through links 140 and 141 to adjust an aligned ordinal actuator in accordance with the value of the key depressed. At the same time the links 140—142 cause an escapement pawl 143 to rock in and out of engagement with the notches 135 of an escapement rack fixed to the actuator carriage 120, and to shift the selection set-up carriage 136 one order to the right to the next lower order of the actuator carriage.

The value entry keys 110–119 are depressed in the same order as one would write a value on paper and when the decimal point in the figure is reached the decimal point key 127 is depressed which acts through the linkage 144, 145 and 146 to move a stop member 147 on the actuator carriage into the path of the previously mentioned stop lug 148. At the same time the depression of the decimal key 127 acts through links 144, 145 and 145a to rock a latch 149 counterclockwise and release a lever 150 to the urgency of a spring 152. The lever 150 then rocks clockwise, and through contact of the upper end thereof with a shoulder 151 of the actuator carriage 120 is effective to move the carriage toward the right until the ejected stop member 147 contacts the decimal lug 148. In this shifted position of the actuator the decimal point of the factor entered into the actuator carriage 120 is aligned with the decimal point of the accumulator register. After such decimal alignment is completed the keys 110–119 are again depressed to cause the selection setup carriage 136 to enter the decimal digits into the actuating mechanism.

After the value entering operation is completed the handcrank 155 is rotated in a clockwise direction for plus operations or in a counterclockwise direction for a minus operation. The rotation of the handcrank enters the value set up in the actuator carriage 120 into the register 122.

During the rotation of the handcrank, various mechanisms are restored to their initial positions to prepare the machine for succeeding calculations. During addition and subtraction the single order selection setting carriage 136 is returned to its initial position with respect to the actuator carriage 120 and the latter is returned to its initial position with respect to the accumulator register and is cleared of the numeral values and the decimal entered therein, all as is described in the previously mentioned patent application.

During multiplication and division, the selection setting carriage 136 is returned as mentioned above, but the actuator carriage 120 remains stationary relative to the accumulator register to permit plural cycle operation of the actuating mechanism in the current shifted position thereof, after which it may be shifted one or more orders to the right or left for entry of values into successive groups of orders of the register.

The selection setting carriage 136 is restored to its initial leftmost position with respect to the actuator carriage 120 by a cam 156 fixed to the handcrank shaft 164. Cam 156 rocks a pair of yieldably connected shift levers 137 and 137a counterclockwise which restores the selection setting carriage 136 to its initial leftmost position where it is locked by engagement of the pawl 143 with the escapement rack 242. Levers 137 and 137a are connected by a spring 158 which yields when and if the selection setting carriage 136 reaches the leftmost position of the actuator carriage 120 before the carriage itself reaches its left end position. During restoration of the selection setting carriage, a cam 159, also carried by the shaft 164, rocks a lever 161 counterclockwise and through a connecting link 162 rocks a shift lever 150 counterclockwise away from the shoulder 151 of the actuator carriage and at the same times restores the power in spring 152. The shift lever 150 is locked in its extreme counterclockwise position by the latch 149 where it remains throughout the rest of the ordinal actuating operation.

When lever 150 is moved counterclockwise away from shoulder 151 a spring 134 tends to return the actuator carriage 120 to its initial leftmost position but such movement is prevented by a pawl 154 which engages a respective one of the teeth of an actuator escapement rack 153.

The plus-minus key 128 is depressed to condition the machine for addition and subtraction operations and this key acts through the linkage 162 to connect a cam 163 to the handcrank shaft 164. Cam 163 rocks an associated lever 163a counterclockwise and through the connecting linkage shown moves the pawl 154 counterclockwise and disengages the same from the actuator rack 153. At such time the spring 134 is enabled to return the actuator carriage 120 to its initial leftmost position and the machine is thus conditioned for entry of the next addend or subtrahend.

The multiplication-divide key 129 is provided to condition the machine for the operations indicated, and the depression of this key raises the plus-minus key 128 thus disconnecting the cam 163 from the shaft 164. In this manner the rotation of the handcrank has no effect upon the cam 163 and the escapement pawl 154 holds the actuator carriage 120 in its previously set position of alignment with the decimal point 126. The handcrank 155 may therefore be rotated one or more times to enter the selected value into the accumulator register 122, in accordance with the value of a given multiplier or quotient digit. After each ordinal multiplying or dividing operation the actuator carriage is shifted either to the right or left under the control of a shift mechanism described hereinafter so that the actuator carriage may be aligned with different groups of orders of the accumulator register 122.

The previously mentioned counter actuator is carried by a shiftable carriage schematically illustrtaed at 603, and in problems of multiplication and division this carriage is operatively connected to the plural order actuator carriage 120 for the accumulator register so that shifting movement of the latter in either direction causes a similar shifting movement of the counter actuator. For this purpose the actuator carriage 120 carries a rack 604 having notches 605 adapted to receive one or both of the teeth 606 carried by the counter carriage 603 depending upon the relative shifted positions of the rack and the counter decimal indicator.

The depression of a back space key 130 first acts through links 607, 608 and 609 to move the teeth 606 into engagement with respectively aligned notches 605 thus connecting the counter actuator carriage 603 to the accumulator actuator carriage, and then causes a one order escapement of the actuator carriage 120 to the left, at which time the counter actuator carriage 603 also moves one order to the left.

Means are also provided, but not shown in the schematic illustration, whereby a pull on the handcrank towards the right of the machine causes a one order rightward shifting movement of both of the respective actuator carriages for the accumulator and counter registers. In this manner the counter actuator is shifted relative to the respective orders of the counter register and in each such order each rotation of the handcrank 155 causes an entry of a value of "1" into an associated order of the counter register. At the end of the multiplying or dividing operation the counter register 600 indicates the multiplier or quotient, as the case may be.

From the foregoing then, it will be noted that the selective setting of the two decimal points 126 and 601 controls the ordinal location of the entry in each respective register independently of the ordinal setting of the other decimal point and actuator. The machine therefore enters values around fixed decimal points without requiring the operator first to shift the respective carriages to positions of decimal alignment.

*Value entering mechanism*

The value entering mechanism is the same as that disclosed in the previously mentioned patent application and includes the ten keys 110–119 (Fig. 1) and their associated mechanisms. The keys are depressed to adjust the various orders of the numeral wheel actuating mechanism in accordance with the value of the keys depressed, and at the same time the numeral wheels 121 of a factor indicator are each rotated to display the value selected in its respective order.

The mechanism for adjusting the various orders of the actuating mechanism in accordance with the value of the depressed keys includes a stop arm 166 (Fig. 2) in each order of the actuating mechanism. The stop arm has an ear 287 which normally lies adjacent the lowest step 289 of a series of steps 289–299 formed on a selection plate 172. The steps 289–299 are representative of a "blank" value and the values zero to nine respectively. In each order the stop arm 166 is rocked counterclockwise about the shaft 169 a number of increments corresponding to the value of a depressed key, and at such time the selection plate is permitted to rotate counterclockwise a corresponding number of increments until a respective step 289 to 299 contacts the ear 287 whereupon further movements of the selection plate is prevented. The selection plate 172 forms a part of the actuating mechanism, and the selectively set position thereof determines the number of digits which the associated actuator will drive an aligned numeral wheel of the accumulator register.

The arm 166 is adjusted by a mechanism including a selection finger 139 (Fig. 2) carried by the selection set-up carriage generally indicated at 136, and which carriage normally stands aligned with the left-most, or highest, order of the actuating mechanism. The depression of a key 110 to 119 is effective by means of mechanism described in full in the last mentioned application to move the selection finger 139 and a stop pin 165 carried thereby, to the left a number of increments corresponding to the value of the key depressed and at such time the stop arm 166 is permitted to rock clockwise a corresponding number of increments. The stop arm 166 is then locked in its selectively set position and, through the ear 287, holds the selection plate 172 in the selected position.

The depression of a key 110 to 119 also moves the setting carriage 136 to the next lower order of the actuating mechanism so that the selection finger 139 and the stop pin 165 become associated with the next lower order stop arm whereupon the next digit is entered into the machine.

The keys 110–119 (Fig. 1) are depressed in the same manner as one writes a value on paper and when the decimal point of the selected value is reached, the decimal key 127 is depressed. This conditions a hidden decimal point 124 (Fig. 3) for subsequent movement into a position of display immediately to the right of the last digit set up in the factor indicator, and, as explained in connection with the schematic illustration, the actuator carriage 120 is moved to the right to a position in which the decimal point 124 is aligned with the decimal indicator 126 of the accumulator register, such alignment also causing the decimal point 124 to move into view. Then the remainder of the values to the right of the decimal point are entered into the actuating mechanism and into the factor indicator to complete the selection.

The previously described setting of the selection plate 172 (Fig. 2) in a position corresponding to the value of the key depressed also rotates an associated factor numeral wheel 121 a corresponding number of increments to display the value selected. A gear 281 is fixed to the selection plate 172 and meshes with a gear segment 282 forming a portion of a member 283. Member 283 also carries a second gear segment 284 which meshes with a gear 285 fixed to the factor indicating numeral wheel 121. From the above description it will be seen that the rotation of the selection plate 172 rotates the gear 285 and the numeral wheel 121 in accordance with the value of the keys depressed.

The rotation of any factor numeral wheel 121 to a position of value display from zero to nine permits an associated stop lug 147 (Fig. 3) to move from the upper full line position to the bottom dotted line position. The previously mentioned depression of the decimal key 127 (Fig. 1) then moves a stop lug 148 from the position shown in Fig. 3 to the position shown in Fig. 4, and at the same time releases the actuator carriage for shifting movement toward the right. The rightmost stop member 147 (Fig. 3) which has been moved to the lower dotted line position contacts the stop lug 148 and thus limits the shifting movement of the actuator carriage. At such time the last integral digit entered into the factor indicating numeral wheel 121 stands aligned with the first order to the left of the decimal point in the accumulator register.

During the shifting movement of the actuator carriage to a position of decimal alignment with the accumulator register, the selection setting carriage 136 (Fig. 2) and the setting finger 139 are shifted with the carriage so that after the decimal aligning operation is concluded the keys 110 to 119 may be depressed to enter the decimal digits into the actuating mechanism.

For a more complete description of the value entry mechanism and the decimal key and associated mechanisms reference may be had to the previously mentioned patent application.

*Numeral wheel actuating mechanism*

The numeral wheel actuating mechanism of the present invention is the same as that disclosed in the previously mentioned application and, briefly, comprises a gear segment 265 (Fig. 5) pivoted on an arm 267 which is rotated with a shaft 274 once for each rotation of the handcrank. Gear segment 265 is also adapted for limited in and out reciprocating motion relative to the shaft during the rotation thereof. The in and out motion causes the teeth of the segment to engage and then disengage from an intermediate gear 413, and the timing of the in and out motion is such that during the rotation of the gear segment the gear 413 is advanced a number of increments corresponding to the value set up in an associated order of the actuator. The mechanism for controlling the in and out movement of the gear segment includes a "box" cam having opposed cam surfaces 277—278 forming a race way for a roller 275 fixed to the gear segment 265. The box cam is graduated from a low periphery to a high periphery and the arrangement is such that the low periphery holds the roller 275 and the gear segment 265 out of engagement with the gear 413 during rotation of the gear segment, while the high periphery of the box cam causes engagement of the segment 265 with the gear 413. The box cam 277—278 is fixed to the previously mentioned selection plate 172 and is rotated with the plate during the setting of a value into an associated order of the actuating mechanism. It will therefore be seen that the selectively set position of the selection plate 172 and the box cam determines the in and out movement of the gear segment 265 in timed relation to the rotation of the segment, thus controlling the selective rotation of gear 413.

The above mentioned gear 413 meshes with a gear 620 fixed to the numeral wheel 123 of the accumulator register and during the actuating movement rotates the numeral wheel 123 in accordance with the value set up in an associated order of the actuating mechanism.

Counter actuating mechanism

The previously mentioned single order counter actuating mechanism is shiftable relative to the numeral wheels of the counter register, and is effective in any ordinally shifted position to advance an aligned numeral wheel one digit for each cycle of operation of the accumulator register actuating means.

At the beginning of a calculation, the counter actuator is operatively related to the counter decimal indicator 601, i. e., it moves with the decimal indicator when the latter is set in a selected ordinal position of the register, the arrangement being such that the counter actuator is normally aligned with the first order to the left of the counter decimal indicator.

During a plural order calculation the counter actuator is coupled to the plural order actuator carriage for the accumulator register while the counter decimal remains stationary. In this manner the shifting movement of the accumulator actuator moves the counter actuator a corresponding number of orders relative to the counter register and to the counter decimal indicator 601.

This arrangement makes it possible to enter a value into the counter register in correct ordinal relationship to a decimal point 601 regardless of the ordinal position selected therefor.

The counter register actuating mechanism comprises a single toothed element 630 (Figs. 5 and 9) which is fixed to a hub 631 having keyed connection with a counter actuator drive shaft 420. The hub and the element referred to hereinafter as the counter actuator, are slidably mounted on the saft 420 so that the counter actuator may be aligned with any order of the counter register 600.

Each ordinal numeral wheel 632 of the counter register carries a gear 633 which is geared to the counter actuator 630. The drive shaft 420 is rotated once for each cycle of the operation of the main numeral wheel actuating mechanism and acts through the counter actuator 630 and the gear train 635, 634 and 633 to enter a single increment of count into an aligned numeral wheel 632 for each such cycle of operation.

The shift mechanism for the counter actuator includes a fork 637 which engages an annular groove 636 of hub 631. The fork 637 is fixed to a frame member 638 which is mounted in the machine for sliding movement relative to the counter register. The leftmost end 602 of the frame member 638 projects through a slot in the machine cover and serves as a visible pointer for indicating the order of the counter register with which the counter actuator is associated.

A bracket 639 is fixed to the right depending end of the frame member 638 and two pairs of rollers 640 are carried between the bracket and the frame member. The rollers and shaft serve to guide the framework 638 during its shifting movement. A spring 642 is fixed at one end to the bracket 639 and at its opposite end the spring is connected to a side frame of the machine (not shown). The spring constantly urges the frame member 638, and also the counter actuator 630, toward the right of the machine.

Normally the frame member 638 is urged against a latch 643 (Figs. 5 and 5A) carried by a portion of the decimal indicating mechanism for the counter register as is later explained, and this arrangement is provided to normally maintain the counter actuator aligned with that order of the counter register which is the first order to the left of the decimal indicator as shown in Fig. 1. The counter indicator and the control of the same over the counter actuator is described in the following section.

Counter register decimal point

The counter register decimal point 601 (Figs. 1 and 5) is formed as an extension of a carriage 644 mounted for sliding movement on transverse shafts 645 and 646. Two pairs of rollers 647 are carried between the carriage and a bracket 648 fixed to said carriage to support the same on shaft 645, while a pair of rearwardly extending members 649 of the carriage are mounted for sliding movement on shaft 646.

A rack 650 is fixed to a back machine frame 626 and has ordinally spaced notches which are adapted to receive the nose of a latch 652 pivotally mounted on shaft 646. The latch 652 has a hub 654 which is embraced by the previously mentioned members 649 so that the latch is mounted for sliding movement on shaft 646 with the counter decimal carriage 644.

A torsion spring (not shown) constantly urges the latch counterclockwise into engagement with the rack 650 and therefore holds the counter decimal point 601 in any selectively set position of the counter register.

A thumb piece 655 is provided for releasing the latch 652 from the rack 650 so that the counter decimal point may be moved to any selected ordinal position of the counter register, and for this purpose the thumb piece 655 has an extension 656 which is pivotally mounted on a shaft 657 carried by the decimal point carriage 644. The right end 658 of the extension 656 underlies a roller 659 mounted on the upper end of latch 652 so that downward force on the thumb piece 655 rocks the rearwardly extending portion 658 counterclockwise and thus moves the latch clockwise against the urgency of its torsion spring to cause disengagement of the latch 652 from the rack 650. Then, while holding the thumb piece depressed the counter decimal indicator 601 may be shifted laterally of the machine in either direction and locked in a selected ordinal position by release of the thumb piece.

The ordinally selected position of the counter decimal indicator 601 controls the ordinal location of the counter actuator 630 in the following manner. A bracket 660 is carried by the counter decimal point carriage 644 and to which bracket is pivotally mounted the previously mentioned latch 643 (Figs. 5 and 5A) with the depending portion of the latch normally lying in the plane of movement of the actuator carriage member 638. The latter is constantly spring urged toward the left as seen from the rear of the machine in Fig. 5A but the latch 643 normally locks the carriage member 638 and the counter actuator 630 to the decimal indicator frame 644.

The counter actuator is coupled to the accumulator register actuating mechanism for shifting movement with the latter during a plural order calculation and at such time the latch 643 is disabled to permit shifting movement of the counter actuator without causing similar shifting movement of the counter decimal point, the latter being locked in a selective ordinal position at this time. The mechanism for connecting the counter actuator and the accumulator actuating mechanism will be described in connection with the description of the back space key and the shift mechanism.

Accumulator register decimal point

The decimal indicator 126 (Figs 1 and 3) is selectively settable in any ordinal position in the accumulator register and, together with the stop lug 148, carried by the decimal indicator 126, is effective upon depression of the decimal key to control the escapement of the actuator carriage to a position in which the decimal point 124 is aligned with the decimal point 126.

The decimal indicator 126 is slidably mounted on a shaft 311 by means of the thumb piece 320, and is locked in a selected position by a tooth 316 seating in a rack 318. Stop lug 148 is mounted for sliding movement on shaft 315 and is connected to the decimal indicator 126 so that it moves with the indicator to a selected ordinal location in the accumulator register. During the entry of the factor digits into the actuator and factor numeral wheels, the stop members 147 are set from the solid line position to the dotted line position shown in Fig. 3. When the decimal key is depressed during such entry, the lug 148 is moved from the position shown in Fig. 3 to that shown in Fig. 4, and the actuator carriage is released for shifting movement toward the right. Upon contact of the leading stop member 147 with the lug 148, the shifting movement of the actuator carriage is stopped. Since the lug 148 and the stop member 147 represent the location of the decimal point in the register and of the value entered in the actuator carriage respectively, the stopping of the actuator carriage by the stop member and lug causes decimal alignment of the factor with the preselected position of the decimal point in the register 122, all as described in detail in the aforementioned application.

Drive mechanism

Figure 13:
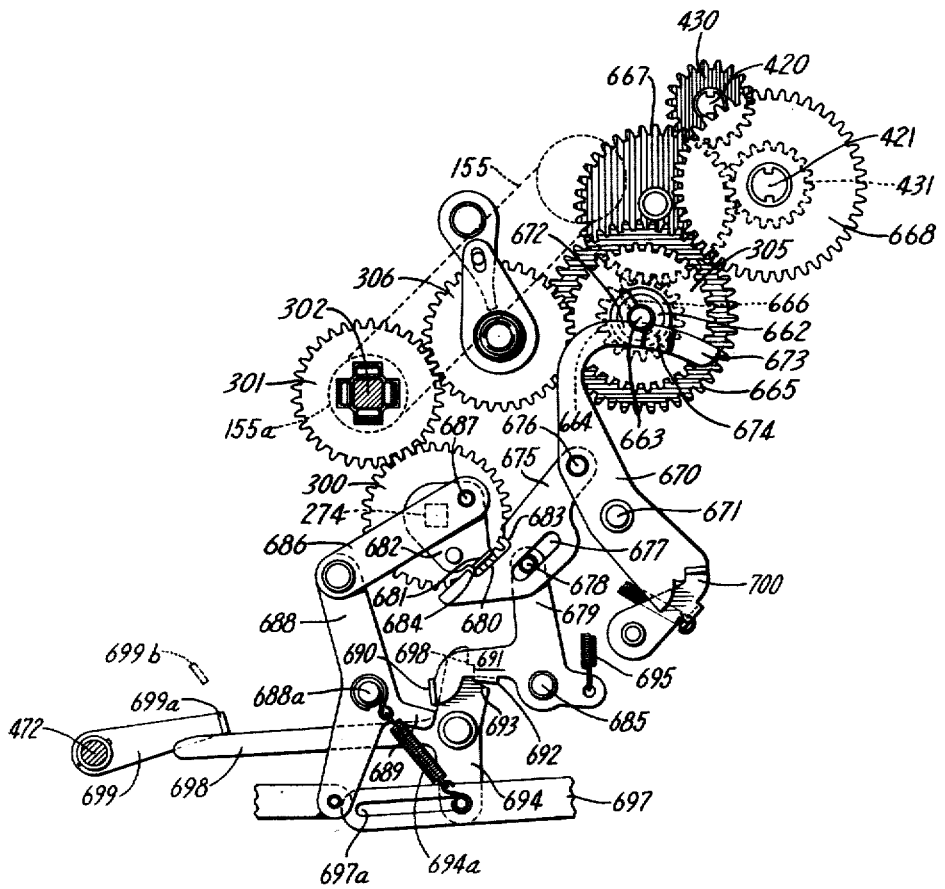
Fig. 13 is a right side view, partly in section, of the main drive train and associated mechanisms.

The power for driving the accumulator and counter actuators is derived from a handcrank 155 which is fixed to a shaft 302. A gear 301 (Fig. 13) is fixed to the shaft 302 and meshes with a gear 300 fixed on a shaft 274. The latter shaft carries the plural order actuating mechanism for the accumulator register as is described in full in the last mentioned application.

Gear 301 also drives a gear train including gears 306 and 305, the latter having a hub 662 freely mounted upon an endwise shiftable shaft 663. A pair of reversing gears 664 and 665 are mounted upon the hub 662 and are adapted to be alternatively connected for rotation with the hub. For this purpose a keyway (not shown) is cut through the hub 662 and when the machine is in a condition of rest this keyway is aligned with a pair of similar keyways cut in the hubs of the reversing gears 664 and 665. A key 666, carried by the previously mentioned shaft, protrudes through the keyway in hub 662 and alternatively engages one or the other keyways of the gears 664 and 665 depending upon the shifted position of the shaft 663. The shaft 663 is controlled in a manner later described and the arrangement is such that the key transmits a drive from the hub of gear 305 to either of gears 664 and 665 depending upon the lateral position of shaft 663.

Gear 664 meshes with an idler gear 667 which transmits a drive directly to the gear 430 on the counter drive shaft 420. Gear 665, on the other hand, meshes with an idler reversing gear 668 integral with a gear 431 which meshes with gear 667.

This drive reversing unit is of a type well known in the art and further description is believed unnecessary, it being noted that the shaft 663 transmits a drive from the hub 662 to either of the gears 664 and 665 and when one of these gears is so engaged the other gear is idly driven since both gear trains have a common connection with the gear 667.

Counter reverse control mechanism

The counter reverse control mechanism includes means operable during the entry of each factor in addition or subtraction to set the reversing shaft 663 so as to cause positive driving of the counter actuator regardless of the direction in which the handcrank is turned. Thus during problems of addition and subtraction the counter register will indicate the total item count of both positive and negative cycles of actuation. During problems of multiplication, however, the reversing shaft 663 must be maintained in one of two set positions to cause actuation of the counter of a sign similar to that of the product register actuator, and in problems of division the reversing shaft must be maintained in the other of its two settable positions to cause actuation of the counter in an unlike sign relative to that of the main numeral wheel actuator.

The mechanism for causing endwise shifting movement of the counter reversing shaft 663 to one or the other of two settable positions includes a lever 670 (Fig. 13) which is freely mounted on a stud 671. The upper end of lever 670 has an arcuate surface 672 and laterally offset therefrom is an arcuate surface 673 connected by an intermediate camming surface 674. In the position of the parts shown in Fig. 13 the arcuate surface 672 is engaged with an annular groove in shaft 663 and holds the shaft 663 in one endwise position with the key 666 connecting the gear 664 to the hub 662 of gear 305; consequently, clockwise rotation of the handcrank and gear 305 drives the shaft 420 in a positive or clockwise direction.

When lever 670 is moved counterclockwise the camming surface 674 slides shaft 663 outwardly to connect the hub 662 of gear 305 to the gear 365 so that clockwise rotation of the handcrank and gear 305 drives the shaft 420 in a negative or counterclockwise direction. A click pawl 700 is spring urged counterclockwise and engages within either one of two notches cut in the lower end of the lever 670 to hold the lever in either of its two adjusted positions.

So that a positive item count is made in the counter register during problems of addition and subtraction means are provided to adjust the counter reverse mechanism whenever the handcrank is reversed and when the +, − key 128 is depressed. The counter reverse lever 670 therefore remains in the "like sign" position shown as long as the main actuator drive shaft 274 is rotated in a counterclockwise "plus" direction, but as soon as the actuator shaft is rotated in the opposite "minus" direction, a control means, described below, is responsive to the change in direction of the actuator shaft to move the reversing lever 670 counterclockwise to its unlike sign position and cause a positive count of the negative cycles of numeral wheel actuation. This same control means also returns the counter reverse lever 670 to its like sign position shown when the direction of rotation of the main actuator shaft 270 is changed from minus to plus.

The mechanism for controlling the movement of the reversing lever 670 includes a link 675, pivoted at 676 to the reversing lever. A slot 677 is cut in link 675, and a pin 678 carried by a bellcrank 679 normally holds the link in the position shown. A notch 680 is cut in link 675 and cooperates with an ear 681 of a crank 682 fixed to the main actuator drive shaft 274. If the shaft 274 is rotated in a counterclockwise direction, which is the case during positive actuation of the accumulator numeral wheels, then the ear 681 moves upwardly and past a shoulder 683 on link 675, and therefore does not move the link nor change the position of the reversing lever 670. On the other hand if shaft 274 is rotated in a clockwise direction, which is the case during negative driving of the accumulator numeral wheels, then the ear 681 contacts a shoulder 684 and moves the link 675 toward the left. The link in turn moves the reversing lever 670 counterclockwise and causes reversing of the drive to the shaft 420 for the counter actuator to cause a positive count of the negative cycles of actuation.

During problems of multiplication and division, with the ×, + key 129 depressed, the counter reverse lever 670 is set in its like or unlike sign position, respectively, during the first cycle of rotation of the shaft 274. The link 675 is rocked counterclockwise about its pivot 676 as described below and is locked in a position where the shoulders 683 and 684 of the link are out of the path of movement of the crank ear 681, thus preventing any resetting of the counter reverse lever 670 during reversal of the handcrank. Lever 670 therefore is maintained in its set position throughout the remainder of the problem, and the multiplier, or the quotient, as the case may be, is registered in the counter as a positive number.

During addition and subtraction, the link 975, after performing its setting of the counter reverse lever 670, is rocked counterclockwise out of the path of crank ear 681 in exactly the same way as during multiplication or division, but is returned to the position shown before the end of the cycle of actuation is ended; consequently, the link stands in the position shown at the beginning of each addition or subtraction operation and performs the counter-reversing function previously described.

The only difference in the control over the link 675 during addition-substraction and multiplication-division, therefore, is that in the latter operations the link is locked in its disabled position. The mechanism for moving the link to a disabled position will first be described, followed by a description of the mechanism for locking the link in such position.

The mechanism for moving the link counterclockwise to a disabled position includes a link 686 (Fig. 13), pivotally mounted on crank 682 at 687. As the crank 682 approaches its mid-cycle position (in either direction of rotation), the link 686 rocks a bellcrank 688 counterclockwise around its fixed pivot 688a. An arm 689 on the bellcrank, through impingement with an ear 690 on bellcrank 679, rocks the latter clockwise about its pivot 685 and against the tension of a spring 695. This causes the pin 678 to rock the link 675 counterclockwise around its pivot 676, moving the shoulders 683 and 684 out of the path of movement of the crank ear 681. During the second half of the cycle of rotation of crank 682 the parts described above return to the position shown in Fig. 13, except in multiplication and division.

The mechanism for holding the link 675 disabled in its counterclockwise position during multiplication and division includes means, enabled by the depression of the ×, + key to lock bellcrank 679 in its clockwise position, thus acting through pin 678 to maintain the disabled condition of link 675.

For this purpose, the depression of the multiply-divide key 129 (Fig. 1) raises the add-subtract key 128 and, as described in the previously mentioned patent application, rocks a shaft 472 (Fig. 13) counterclockwise from the position shown. A lever 699, fixed to this shaft, has an ear 699a which is moved to the dotted line position 699b above and away from an arm 698 of a lock lever 694. At such time a spring 694a tends to rock the lock lever clockwise, but this movement is normally prevented by an ear 692 on bellcrank 679 which overlies a shoulder 693 on the lock lever. When bellcrank 679 is rocked clockwise as previously described, a second shoulder 698 on the latch lever 694 rocks under ear 692 thus locking the bellcrank in its clockwise position and holding link 675 in disabled position.

Shift mechanism

The shift mechanism includes two opposed spring means which are selectively enabled to shift the actuator carriage 120 to the right or left. One of these spring means normally urges and holds the actuator carriage in its leftmost position relative to the accumulator register; however, the depression of the decimal point key enables the second spring means to overcome the first spring means and shift the actuator carriage to the right to a position of decimal alignment with the accumulator register, all as described in detail in the aforementioned application.

After such decimal alignment, the problem to be performed may require that the main actuator carriage be shifted one or more orders to the right or left. For example, in a division problem when the number of digits before the decimal point of the divisor is greater or less than those in the dividend, the actuator carriage must be shifted to the right or left to align the leftmost digit of the divisor with the leftmost digit of the dividend. Also, during a multiplication problem the actuator carriage must be shifted to the right or left to permit the entry of the various members of multiplier digits.

For this purpose a back space key is provided which may be depressed to disable the above mentioned second spring and releases the first spring for a step-by-step escapement of the actuator carriage toward the left; whereas, a lateral right pull on the crank handle causes a step-by-step shift to the right against the tension of the first spring.

The back space key and the pull shift mechanism are also both effective to operatively connect the counter actuator to the above mentioned actuator carriage so that the counter actuator shifts in both directions with the main actuator carriage.

Figure 6:
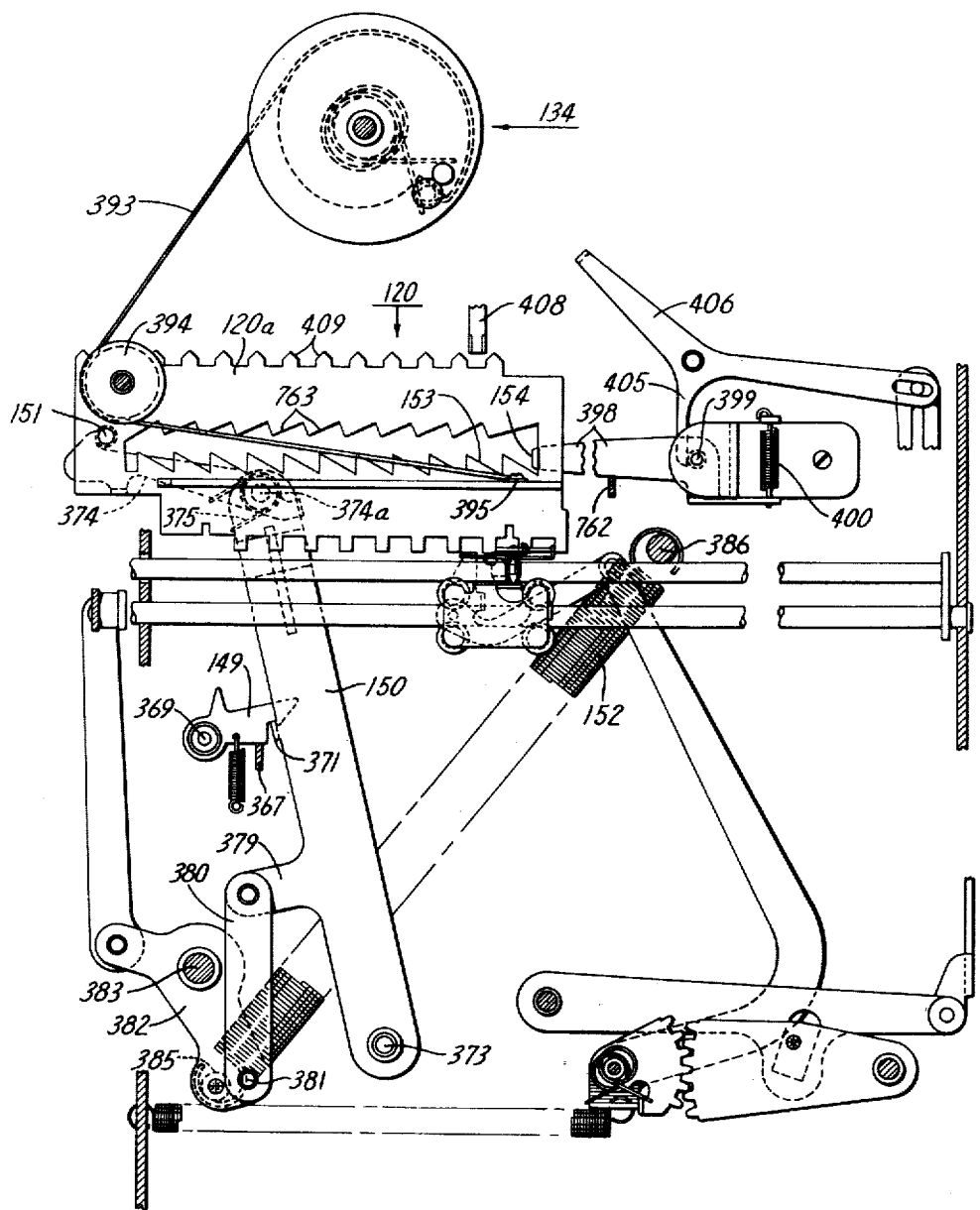
Fig. 6 is a plan view of part of the shift mechanism.

The spring means which normally urges the actuator carriage 120 (Fig. 6) toward the left comprises a spring mechanism 134, identical to spring mechanism of the same reference numeral in the previously mentioned application, and which spring mechanism includes a connecting tape 393 running around a roller 394 and anchored at 395 to the bottom actuator frame plate 120a.

An upstanding ear 154 on a pawl 398 engages the right most end of an escapement rack 153 cut in the bottom plate of the actuator carriage and holds the actuator carriage in the position shown against the tension of the spring mechanism 134.

The mechanism for shifting the actuator carriage 120 toward the right against the tension of the spring mechanism 134 includes spring 152, which has an effective strength that is greater than spring 134. Spring 152 is anchored to a stud 386 fixed to the machine framework, and is connected at its other end to a stud 385 on a lever 382. Lever 382 is pivotally mounted on a fixed stud 383 and carries a stud 381 upon which is mounted a link 380, the upper end of which is pivotally connected to an extension 379 of the shift lever 150. The latter is pivotally mounted upon a stud 373 fixed to the bottom frame plate of the machine, and the arrangement is such that the spring 152 tends to move the shift lever 150 clockwise from the position shown. Such movement is prevented, however, by engagement of a latch 149 with a depending ear 371 on the shift lever 150.

The rearward end of the shift lever 150 carries a hook shaped member 374 which is freely mounted on the shift lever at 374a and urged clockwise by torsion spring 375. The leftmost end of the hook lies adjacent a stud 151 depending from the actuator carriage frame plate 120a, and upon release of the shift lever 150 from the latch 149 the hook 374 moves the actuator carriage toward the right to a position of decimal alignment with the accumulator register, as previously explained.

The depression of the decimal key 127 (Fig. 8) trips latch 149 thereby releasing the shift lever 150 as follows. A stud 352 is carried by the bottom of the keystem, and upon depression of the key, rocks a lever 365 counterclockwise about a pivot 366. At such time, an arm 367 of the lever rocks the latch 149 (Fig. 6) counterclockwise out of engagement with ear 371. The spring 152 then overcomes the spring mechanism 134 to cause the shift lever 150 and the shift hook 374 to move the actuator carriage 120 toward the right until the previously mentioned stop member 147 (Fig. 4) contacts the decimal lug 148.

During the rightward shifting movement of the actuator carriage the ear 154 (Fig. 6) of the pawl 398 slides over the successive teeth 153 causing it to oscillate idly about its pivot 399 until the actuator carriage comes to rest in a position of decimal alignment mentioned above. Then the ear 154 of the pawl engages with a respective tooth 153 of the escapement rack and holds the actuator carriage 120 in this position even though the shift lever 150 is subsequently returned to its initial position by the cam 159 (Fig. 14) upon rotation of the handcrank, all as fully explained in the previously mentioned application.

After the actuator carriage has been shifted to a position of decimal alignment by depression of the decimal key and after one or more cycles of numeral wheel actuation have been completed in the current order, the actuator carriage 120 may be shifted either to the left or to the right by means now described.

*Back space key*

With the shift lever 150 returned and locked in its initial leftmost position, a single depression of the back space key 130 (Fig. 9) permits the spring mechanism 134 (Fig. 6) to shift the actuator carriage 120 one order to the left by moving the escapement pawl 398 out of engagement with the escapement rack 153 and into engagement with a half step rack 763 and then back into engagement with rack 153. It will be noted, however, that several preliminary functions noted below must take place before such escapement is permitted to occur.

In some cases the operator may depress the back space key and cause a leftward shift of the actuator carriage before the handcrank is rotated and before the shift lever is returned to its initial positon, thus causing an interference between the shift hook and the pin 151 if means were not provided to prevent it. Means are therefore provided which are operable by the depression of the back space key to disable the connection between the shift hook 374 and the actuator carriage 120 so that the spring mechanism 134 will be enabled to return the actuator carriage 120 towards the left. The mechanism for moving the shift hook 374 (Fig. 6) out of engagement with the pin 151 includes a bail 710 (Fig. 7) the leftmost end of which lies adjacent an ear 711 on the shift hook 374. The bail has a downwardly bent flange 712 which in turn is bent forwardly at either end thereof to form a pair of ears 713. The ears 713 are pivotally mounted upon a shaft 714 supported by a pair of brackets 715 fixed to the framework of the machine.

The bail 710 is rocked about the shaft 714 to disengage the shift hook 374 from pin 151 by means including a link 716 (Fig. 9) having two slots 717 and supported by a guide pin 718 fixed in the machine framework, and a pin 720 carried by a lever 721. Lever 721 is freely mounted on a fixed stud 722 and the upper arm of lever 721 is pivotally connected at 723 to the keystem 724 of the back space key which is slidably mounted upon a fixed stud 725 for up and down movement within the machine framework. Depression of the back space key 130 rocks the lever 721 clockwise and moves the link 716 towards the left as viewed in Fig. 9, and through a lug 719, rocks the bail 710 counterclockwise about shaft 714. This moves the bail 710 into engagement with the ear 711 (Fig. 7) and thus moves the shift hook 374 out of engagement with the stud 151 (Fig. 6) of the actuator carriage to permit a left shift of the latter without interference from hook 374.

Upon disengagement of the shift hook from stud 151, however, spring 152 tends to rock the shift lever 150 clockwise with a snap action which, if not prevented from doing so, would cause considerable wear and tear upon the parts in addition to creating unnecessary noises. Means are therefore provided which are operable by the depression of the back space key to lock the shift lever in its currently set position before the shift hook is removed from the actuator carriage pin 151. This means includes a toothed rack 751 (Figs. 7 and 10) having a pair of rearwardly bent ears 752 pivotally mounted upon the previously mentioned shaft 714. A series of ordinally spaced teeth 753 are formed on the bottom of the rack 751 and overlie an extension 754 (Fig. 10) of the shift lever 150. The shift lever and the extension 754 are normally free to move relative to the rack 751 and shift the carriage toward the right, but upon depression of the back space key the rack is rocked in a counterclockwise direction to engage the extension 754 and thus hold the shift lever in its current ordinal position. For this purpose, the previously mentioned link 716 (Fig. 9) has a shoulder 755 (Fig. 10) which normally lies adjacent a pin 756 fixed to the rack 751, and in the normal position of link 716, the shoulder 755 holds the rack 751 above and out of engagement with the extension 754. Link 716 is yieldably connected to stud 756, by a spring 758 connected between that stud and a stud 757 fixed to link 716, the arrangement being such that when the back space key is depressed and link 716 is moved to the left as viewed in Fig. 10, the spring 758 urges the stud 756 and therefore the rack 751 counterclockwise about the supporting shaft 714. This causes the teeth 753 to engage the extension 754 and hold the shift lever 150 in its currently set position. Since the shift lever 150 and its extension 754 are spring urged toward the right as viewed in Fig. 7, the contact of the extension 754 with a respective tooth 753 is effective by means of friction to hold the rack 751 in engagement with extension 754 and to thus lock the shift lever even after the back space key is released.

It will be recalled that the decimal lug 148 (Fig. 4) is moved into the plane of the stop members 147 by depression of the decimal key, and therefore it will be obvious that any shifting movement of the actuator carriage relative to the decimal lug 148 after the decimal key is depressed would cause interference between the stop members 147 and the decimal lug if means were not provided to prevent this. Means including a link 359 (Fig. 9) are therefore provided which are operable by the back space key 130 to move the decimal lug 148 from a position shown in Fig. 4 to its initial position shown in Fig. 3. Link 359 (Fig. 9) is connected to an arm 723 by a stud 356, and arm 728 freely pivoted on a fixed stud 358. The depression of the back space key 130 acts through a camming surface 730 formed on the lower end of the keystem to engage and move the stud 356 to the counterclockwise position shown in Fig. 8 at which time the link 359 is moved to the right and shaft 311 is rocked counterclockwise. Shaft 315 is fixed to respective depending arms on shaft 311 and rocks the latter shaft counterclockwise, whereupon the decimal lug 148 is moved from the position shown in Fig. 4 to its initial position shown in Fig 3, where it is out of the path of the stop members 147, thus permitting the actuator carriage and the stop members 147 to be shifted in either direction without interference from the decimal lug.

Another conditioning function is operable by the back space key before this key is depressed far enough to shift the actuator carriage one step to the left. This function is to connect the counter actuator frame 638 (Fig. 9) to the main actuator carriage 120 so that each time the latter is shifted one order in either direction the counter actuator 630 will be shifted with it. The mechanism for making this connection includes a pair of levers 606 (Figs. 14 and 9) each of which is pivotally mounted as at 731a to a bracket 732 carried by the counter frame 638 and adapted for engagement with a rack 604 fixed to the actuator carriage 120. Levers 606 are pivotally connected to a transverse shaft 733 supported at opposite ends by a pair of arms 734 fixed to a second transverse shaft 735 suitably mounted within the machine, and a depending lever 736 is fixed to shaft 735. A pin 737 is carried by lever 736 and is embraced by the bifurcated end 738 of a lever 739 pivotally connected to an upstanding ear 740 (Figs. 9 and 10) of a lever 741 pivoted at 742 to the bottom frame work of the machine. The opposite end of lever 741 lies adjacent an ear 743, depending from the previously mentioned link 716. It will be recalled that depression of the back space key 130 moves link 716 toward the front of the machine or toward the left as viewed in Figs. 9 and 10, at which time ear 743 engages the lever 741 and rocks the upstanding member 740 toward the right as seen in Fig. 9. This moves the link 739 toward the right and through its connection with the pin 737, rocks levers 736 and 734 counterlockwise about the pivot 735. At such time the shaft 733 moves toward the left and rocks lever 606 clockwise about its pivot 731a. Levers 606 lie adjacent an ordinally notched rack 604 fixed to the actuator carriage 120 and, upon clockwise movement thereof, each lever 606 engages a notch of the rack 604 and connects the counter actuator carriage frame 638 to the actuator carriage 120. During shifting of the counter actuator frame 638, the locking levers 606 slide along the shaft 733.

A locking mechanism including a latch 745 (Fig. 9) is provided for holding the connecting levers 606 in engagement with the rack 604. Latch 745 is pivoted to a stud 746 fixed to the bottom frame of the machine and is spring urged into engagement with the lower end of lever 736. When the latter is moved counterclockwise by depression of the back space key, as previously mentioned, the latch 745 locks lever 736 in this position and thereby holds the connecting levers 606 in engagement with the rack 604. A mechanism (not shown and forming no part of the present invention) connects the lower dial clear key 131 (Fig. 1) to the latch 745 for moving the latch 745 out of engagement with the lever 736 during a clearance operation whereupon lever 736 rocks clockwise under urge of a spring and disconnects the lever 606 from the actuator rack 604.

Another operation caused by depression of the back space key 130 is to shift the main actuator carriage 120 and the counter actuator 630 one step or, step-by-step, toward the left of the machine. From an examination of Fig. 6 it will be evident that with the shift hook 374 disengaged from the pin 151, any movement of the pawl 398 clockwise around its pivot 399 and back to the initial position, will permit the spring mechanism 134 to move the actuator carriage 120 one step toward the left. The mechanism for reciprocating the pawl 398 includes an ear 762 (Figs. 6 and 9) on the previously described link 739 (Fig. 9). It will be recalled that depression of the back space key moves the link 739 toward the right as seen in Fig. 9, and at such time the ear 762 (Fig. 6) moves the ear 154 on pawl 398 clockwise, out of engagement with rack 153 and into engagement with a respective one of the teeth 763, thus permits a half-step escapement of the actuator rack 120 toward the left. When the back space key is released the pawl 398 is urged by a spring 400 to its initial position where the ear 154 contacts the next successive tooth 153 and holds the actuator carriage in this next ordinal position. Since the counter actuator frame is connected to the main actuator carriage during the first part of the depression of the back space key, the counter actuator frame also shifts one order to the left when the key is fully depressed to shift the main actuator carriage one order to the left.

*Right shift mechanism*

The actuator carriage 120 and the counter actuator frame 638 are shifted to the right by a mechanism including the crank handle 155 (Fig. 11). A lateral pull on the crank handle in the direction indicated by the arrow operates the various shift conditioning mechanisms described in connection with the back space key, but shifts the actuator carriage and the counter actuator frame toward the right one ordinal step for each pull on the crank handle.

The crank 155 is fixed to the shaft 302 by means of screw 780. A portion of the right end of shaft 302 is square and the remainder of the shaft is round, the square portion of the shaft being supported within the machine frame by four rollers 681 which are journalled on a hub 155a (Fig. 13) fixed to the previously described drive gear 301. The left end of the shaft 302 (Fig. 11) is pivotally connected with an arm 782 of a shift plate 783. The latter is pivotally mounted at 784 and 785 to the respective brackets 786 and 787 carried by the frame of the machine. A pull on the handcrank 155 toward the right rocks the shift plate 783 counterclockwise about its pivots, at which time an ear 788 on arm 782 is moved toward the right of the machine. A roller 359a (Fig. 9) is mounted on link 359 and when the decimal mechanism is set by depression of the decimal key the roller is moved to the position shown in Fig. 9, and in this position the roller is in the path of the ear 788; consequently the above-described movement of the ear engages the roller at a point some distance "off center." The roller thus serves as a cam and as the ear 788 moves over the roller it moves the link 359 rearwardly or toward the right as viewed in Fig. 9. This rocks shaft 311 counterclockwise and the decimal lug 148 (Fig. 4) is therefore returned to the position shown in Fig. 3 to permit free shifting movement of the decimal stops 147 past the lug 148 without interference from the same.

A rightward pull on the crank handle is also effective by means including a roller 791 (Figs. 11 and 12) to connect the counter actuator frame to the main actuator carriage for shifting movement therewith. The roller 791 is freely mounted on a stud 792 which is carried by an arm 793 of plate 783. Roller 791 lies adjacent a camming surface 794 (Fig. 12) formed on an arm 795 and having an upwardly extending portion 796 fixed to the previously mentioned shaft 735 (Fig. 9). A pull on the crank handle 155 (Fig. 11) therefore causes roller 791 (Fig. 12) to engage the camming surface 794 and rock the arm 795 together with the shaft 735 counterclockwise (as seen in Fig. 9). At such time lever 736 is rocked counterclockwise and through its pivotal connection 733 moves the levers 606 clockwise about their fixed pivots 731a to cause engagement of the connecting levers 606 with the rack 604 in a manner previously described.

A rightward pull on the crank handle also disconnects the shift hook 374 (Fig. 6) from the actuator carriage pin 151 in a manner similar to that described in connection with the depression of the back space key. For this purpose, the previously mentioned arm 793 (Fig. 11) carries a pin 798 which lies adjacent an arm 799 (Fig. 10) of a lever 800 pivotally mounted on a stud 801 fixed to the bottom frame of the machine. A second arm 802 lies adjacent the rearward end 803 of the previously mentioned link 716.

When the crank 155 (Fig. 11) is pulled toward the right, the pin 798 (Fig. 10) contacts arm 799 and rocks lever 800 clockwise, whereupon the arm 802 contacts the end of link 716 and moves it endwise. Extension 719 (Fig. 7) of link 716 therefore moves the rail 710 (Fig. 7) towards the front of the machine and by contact with the ear 711 of the shift hook 374 rocks the latter counterclockwise away from the pin 151.

A pull on the crank handle also locks the shift lever 150 (Fig. 7) in the current ordinally shifted position in which it stands at the time the crank handle is pulled. The above described mechanism for moving the link 716 toward the front of the machine is also effective through the spring connection 758 (Fig. 10) and pin 756 to rock the rack 751 counterclockwise into engagement with the extension 754 of the shift lever 150. This mechanism locks the shift lever in exactly the same way as previously described in connection with depression of the back space key.

A rightward pull on the crank handle also moves the stop lever 643 (Fig. 5A) of the decimal point carriage 644 out of the path of movement of the counter actuator carriage 638 to permit rightward shifting of the latter relative to the decimal point carriage 644 (Fig. 5). It will be recalled that shaft 735 (Fig. 5) and lever 736 are rocked counterclockwise by a pull on the crank handle. A link 764 connects lever 736 to a depending portion 769b of a transverse bail 769 pivotally mounted at 769a and therefore rocks the bail 769 clockwise. At such time the bail 769 contacts the lever 770 (Fig. 5A) and rocks the same counterclockwise about its pivot 646. The upper end 771 of the lever 770 (Fig. 5A) contacts arm 643a of lever 643 and rocks the same clockwise out of the path of the counter actuator carriage 638 to permit rightward shifting movement of the latter (leftward as seen in Fig. 5A).

The last function performed by a pull on the crank handle is to shift the actuator carriage one order toward the right, and through a connection previously established, to move the counter actuator toward the right with the actuator carriage. For this purpose a right shift lever 804 (Fig. 12) is pivotally mounted at 805 to the previously mentioned arm 793. Lever 804 has a camming surface which normally lies adjacent a pin 807 fixed to the bottom frame plate of the machine, a spring 808 being provided to urge the lever 804 in a counterclockwise direction against the pin. A tooth 809 is formed on the shift lever and is adapted to engage between any two adjacent teeth 810 which depend from the bottom of the actuator carriage bottom plate 120a (Fig. 5). With the parts in the position shown in Fig. 12 the camming surface 806 holds the tooth 809 out of engagement with the teeth 810, but when the crank handle is pulled towards the right and the arm 793 is rocked counterclockwise, as previously described, the shift lever 804 is moved toward the right and the camming surface 806 wipes past the pin 807. This permits the tooth 809 to engage between the teeth 810 of the actuator carriage and shift the same one order towards the right. During such shifting movement of the actuator carriage 120 (Fig. 6) the ear 154 of pawl 398 slides idly over the teeth 153 of the shift rack formed on the actuator bottom plate and then drops down into engagement with the next tooth 153 to hold the actuator carriage in its shifted position.

From the foregoing description it will be seen that a rightward pull on the handcrank is effective to first place the machine in a condition for a right shift and then to cause the right shift. During the right shift movement, the spring mechanism 134 (Fig. 6) is wound up and stores power for returning the actuator carriage to its initial leftmost position. The return is effected by depression of the lower dial clear key 131 which has a connecting linkage (not shown) with the bellcrank 406. The counterclockwise movement of this bellcrank causes arm 405 to contact the bottom portion of pin 399, and in a manner described in the previously mentioned application moves pawl 398 down and out of engagement with the rack 396. This permits the spring mechanism 134 to return the actuator carriage 120 to its initial leftmost position.

*Restoration of counter actuator carriage*

Since the main actuator carriage 120 and the counter actuator carriage 638 may stand displaced a different number of orders from their initial positions at the end of a calculation, separate mechanisms are provided for restoring these two carriages to such initial positions.

It will be recalled that operation of the clear key 131 first disconnects the counter actuator frame 638 (Fig. 9) from the main actuator carriage 120 before returning the latter to its initial leftmost position.

Means including the clear key 131 are also provided for returning the counter actuator frame 638 (Fig. 5) to its initial position adjacent the decimal pointer 601. The clear key 131 (Fig. 1), shown as a slide, is connected to the frame 638 by a cord 815 shown in cross section in Fig. 9. The cord carries a lug 816 which cooperates with a forked ear 817 carried by frame 638. The cord and the lug are spring urged toward the right of the machine where the lug normally stands to permit shifting of the counter actuator carriage 638. Upon operation of the clear key 131, the cord 815 and the lug 816 are pulled toward the left of the machine, the cord passing freely through the forked ear 817 until the lug 816 engages the ear. At such time, the continued movement of the lug moves the frame to the extreme left side of the machine. Then upon release of the key 133, the cord 815 and lug 816 return to their initial rightmost positions, thus permitting the spring 642 to move the frame 638 to the right until such movement is stopped by the contact of the frame 638 with the latch 643 (Fig. 5A). This restores the counter frame 638 to its initial position adjacent the counter pointer in preparation for the next calculating operation.

*Multiplication*

In the performance of multiplication, the decimal point 126 (Fig. 1) is moved to a selected position around which it is desired to accumulate one or more products. Also the counter decimal point 601 is manually set in the ordinal position around which it is desired to enter the multiplier factor. The movement of the decimal point 601 to a selected position also moves the counter actuator indicator 602 to a position in which the counter actuator is aligned with the first order to the left of the counter decimal point. The multiplication-divide key 129 is then depressed to condition the machine for a plural order actuation, after which the multiplicand is entered into the factor indicator 121. During such entry the depression of the decimal key 127 shifts the multiplicand factor indicator 121 and the actuating mechanism to a position of decimal alignment with the decimal point 126 of the accumulator register. Then, the crank handle 155 is rotated one or more times in accordance with the multiplier digit which is to be entered into the "units" order of the counter register. After such an entry is completed, the back space key 130 or the crank handle 155 is pulled endwise in a manner previously described to cause either a left shift or a right shift, respectively. Such shifting movement shifts the actuator mechanism for the accumulator register and also the counter actuator for the counter register one order to the left or right to enable the entry of the next multiplier digit. During the multiplier entry into the counter register, the numeral wheels of the product register are advanced in accordance with the aligned value set in the accumulator actuating mechanism, and after the complete multiplier factor is entered into the counter register the numeral wheels of the product register 122 indicate the complete product in proper relationship to the decimal point 126.

If it is desired to accumulate products, then the next product is entered around the decimal point 126 in the same manner as previously described. The separate multipliers may be accumulated in the counter register around the decimal indicator 601, but if it is desired to enter each multiplier factor separately, then the clear key 133 is operated to clear this register before each successive multiplication.

When a new multiplicand is to be entered into the machine, the clear key 131 is operated to restore the accumulator actuator 120 and the counter actuator to their initial positions, whereupon the new multiplicand may be selected and a new product entered by rotation of the crank handle in a manner previously described. In either case the product and the multiplier factor are both entered in correct decimal relationship to their respective decimal points 126 and 602 regardless of the ordinal positions selected for each.

Division

In division operations the accumulator (dividend) register decimal point 126 and the counter (quotient) register decimal point 601 are set in selected positions around which it is desired to enter the dividend and the quotient respectively. The plus-minus key 128 is then depressed to condition the machine for entry of the dividend into the register 122. Such entry is accomplished by depressing the keys 110 to 119 and the decimal point key 127 in the usual manner to enter the value selected into the factor indicator 121. Then the crank handle 155 is rotated once in a plus direction to transfer the selected dividend value into the dividend register 122 in correct decimal relationship to the decimal point 126. The factor indicator 121 is cleared and the actuator carriage is returned to its initial leftmost position automatically at the end of the handcrank turn. The counter (quotient) register is then cleared in the manner usual in machines of this type by operation of a clear key 133. The multiplication-divide key 129 is then depressed to condition the machine for division operations, and the divisor is entered into the factor indicator 121 by depressing the value entry keys 110–119 and the decimal key 127. During such entry the decimal point of the divisor is aligned with the decimal point 126 of the dividend. The highest order of the divisor is aligned with the highest order of the dividend by depressing the back space key 130 or by pulling the handcrank as the problem may require. Then, the crank handle 155 is rotated in a subtractive direction to subtract the divisor from the dividend until the highest order thereof is reduced to substantially zero or to cause an overdraft, in the usual manner of performing division operations.

After the first ordinal division operation is completed, the divisor standing in the differential actuators is shifted toward the right by a single pull on the handcrank to align the divisor with the next lower order of the remainder. The division operation is then carried out from order to order in the usual manner and at the end of which the quotient is shown in the counter register 600 in correct decimal relationship to the decimal point 601.

A series of quotients may be entered separately into the counter register just as separate multiplier factors were entered into the counter register during multiplication operation, or the quotients may be accumulated around the fixed decimal 601 in the same manner that the multiplier factors were accumulated in this register.

With particular regard to the decimal indicator for the counter register 600, it will be noted that the selected positioning of this decimal point together with the fixed relationship of the counter actuator relative to the decimal point at the beginning of an actuation, permits the entry of a value in correct ordinal relationship to the decimal point regardless of the ordinal position of entry selected for the counter register. This is of particular value in division operation when there is a great difference in the number of decimal orders in the dividend and quotient, respectively.

From the foregoing description of the present invention, it is seen that the product and quotient are each entered into their respective registers in correct relationship to their respective decimal points regardless of the ordinal position selected therefor. This permits an operator to carry out a multiplication or division operation merely by entering the factors into the machine along with depression of the decimal key and by rotating the crank handle the required number of times, without regard to the proper alignment of the various factors to their respective decimal points.

I claim:

1. In a calculating machine, the combination of a counter register comprising a plurality of numeral wheels, a single order actuator therefor mounted for ordinal shifting movement relative to the numeral wheels, a decimal indicator mounted for ordinal shifting movement to any one of a plurality of indicating positions, means for connecting the actuator to the decimal indicator, manually operable means for moving the decimal indicator and the actuator to a selected ordinal location relative to the counter register, mechanism to maintain said indicator in the selected location, a shift key, and means responsive to depression of said key to first disconnect the counter actuator from the decimal indicator and then to shift the counter actuator relative to the numeral wheels and the decimal indicator.

2. In a calculating machine, the combination of a counter register comprising a plurality of numeral wheels, an actuator therefor, a decimal indicator for said register, means for connecting the actuator to the decimal indicator, manually operable means for moving said decimal indicator and said actuator to a selected ordinal location relative to the numeral wheels, means for maintaining said indicator in said selected location, and a normally disabled shift control member for shifting said actuator relative to the numeral wheels, with a key, and means operable in response to depression of said key to disconnect the actuator from the decimal indicator and to enable said control member to shift the actuator.

3. In a calculating machine having, an accumulator register composed of a line of ordinal numeral wheels, a plural order actuator therefor mounted for ordinal shifting movement relative to said register, a counter register composed of a line of ordinal numeral wheels parallel to the line of accumulator numeral wheels, and a single order actuator mounted for ordinal shifting movement relative to the counter register; the combination of manually adjustable means for locating the counter actuator in any one of a plurality of ordinal positions in which it is operable to actuate a corresponding numeral wheel, and means to maintain the counter actuator in said located position, with shifting mechanism for causing ordinal step-by-step shifting movement of said plural order actuator, a key for initiating the operation of said shifting mechanism, means responsive to said key to disable said counter actuator maintaining mechanism, and other means also responsive to said key to connect the counter actuator to the accumulator actuator to cause step-by-step shifting movement of the two actuators in unison with each other.

4. In a calculating machine having an accumulator register composed of a line of ordinal numeral wheels, a plural order actuator therefor mounted for ordinal shifting movement relative to said register, mechanism for tabulating said accumulator actuator through a plurality of orders to a predetermined position relative to the accumulator register, a counter register composed of a line of ordinal numeral wheels parallel to the line of accumulator numeral wheels, and a single order actuator mounted for ordinal shifting movement relative to the counter register; the combination of manually operable means for locating the counter actuator in any one of a plurality of ordinal positions in which it is operable to actuate a corresponding counter numeral wheel, and means to maintain the counter actuator in said located position throughout the operation of said tabulating mechanism, with shift means for causing ordinal step-by-step shifting movement of said plural order actuator, a key for initiating the operation of said shifting means, and means responsive to said key to disable said maintaining means and to connect the counter actuator to the accumulator actuator to permit step-by-step shifting movement of the two actuators in unison.

5. In a calculating machine having an accumulator register comprising a series of numeral wheels, a plural order actuator for the accumulator register mounted for shifting movement relative thereto, a counter register including a plurality of numeral wheels and a single order counter actuator mounted for shifting movement relative to the counter numeral wheels; the combination of, a decimal indicator for the accumulator register, manually operable means for adjusting the accumulator decimal indicator to a location adjacent a selected accumulator numeral wheel, a decimal indicator for the counter register mounted for shifting movement relative to the counter numeral wheels, means for connecting the counter actuator to the counter decimal indicator, manually adjustable means for moving the counter decimal and the counter actuator to a selected ordinal location relative to the counter register, with mechanism including a key for causing ordinal step-by-step shifting movement of the accumulator actuator, means operable by said key to disconnect the counter actuator from the counter decimal indicator, and other means also operable by said key to couple the counter actuator to the accumulator actuator to cause the shifting mechanism to shift the two actuators in unison relative to their respective decimal indicators.

6. In a calculating machine having an accumulator register, decimal indicating means therefor and a shiftable plural order actuator for the accumulator register, a counter register, decimal indicating means therefor and a shiftable single order actuator for the counter register; the combination of, manually operable means for adjusting the counter decimal indicator to a location adjacent a selected counter numeral wheel, means for connecting the counter actuator to the counter decimal indicator, tabulating mechanism including a key and a part of the accumulator decimal indicator for controlling the movement of the accumulator actuator to a predetermined ordinal location relative to the accumulator register, means for maintaining the counter actuator in said adjusted location throughout the tabulating operation of the accumulator actuator, with mechanism including a second key for causing a single order shift of the plural order actuator, and means operable by the latter key to disable said maintaining means and to couple the counter actuator to the accumulator actuator for simultaneous shifting movement of the two actuators relative to their respective decimal indicators.

References Cited in the file of this patent

UNITED STATES PATENTS

| | | |
|---|---|---|
| 1,118,830 | Trinks | Nov. 30, 1914 |
| 1,930,475 | Gustafsson et al. | Oct. 17, 1933 |
| 2,033,088 | Avery | Mar. 3, 1936 |
| 2,108,596 | Rudin | Feb. 15, 1938 |
| 2,243,075 | Anneren | May 27, 1941 |
| 2,537,227 | Lundin | Jan. 9, 1951 |

FOREIGN PATENTS

| | | |
|---|---|---|
| 368,311 | Great Britain | Mar. 4, 1932 |

UNITED STATES PATENT OFFICE

CERTIFICATE OF CORRECTION

Patent No. 2,773,646                        December 11, 1956

Walter E. Mathi

It is hereby certified that error appears in the printed specification of the above numbered patent requiring correction and that the said Letters Patent should read as corrected below.

Column 11, lines 14 and 60, for "+ key" read -- ÷ key --; in each occurrence.

Signed and sealed this 29th day of October 1957.

(SEAL)

Attest:
KARL H. AXLINE
Attesting Officer

ROBERT C. WATSON
Commissioner of Patents